March 9, 1926.
T. A. TISDELL
1,576,075
COMBINED GOCART, HIGH CHAIR, AND BABY CARRIAGE
Filed Jan. 24, 1925    2 Sheets-Sheet 1
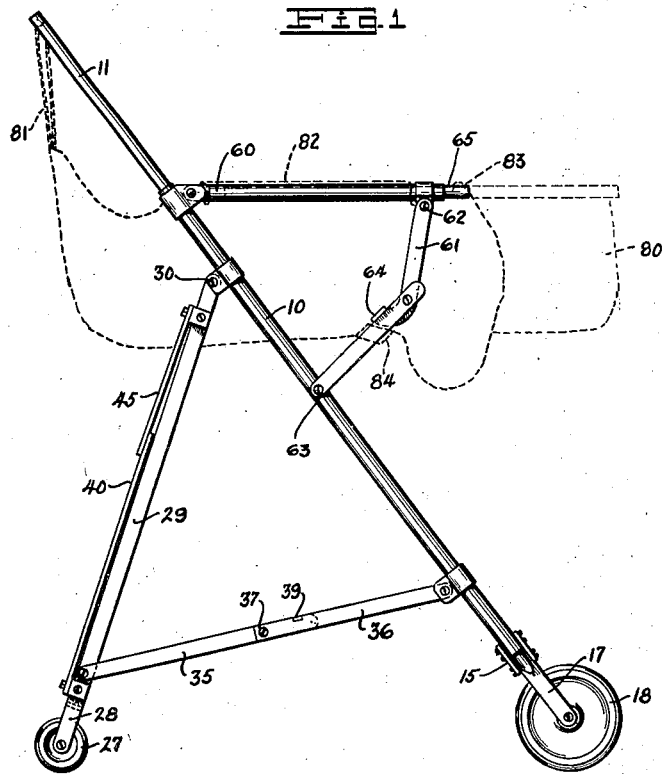
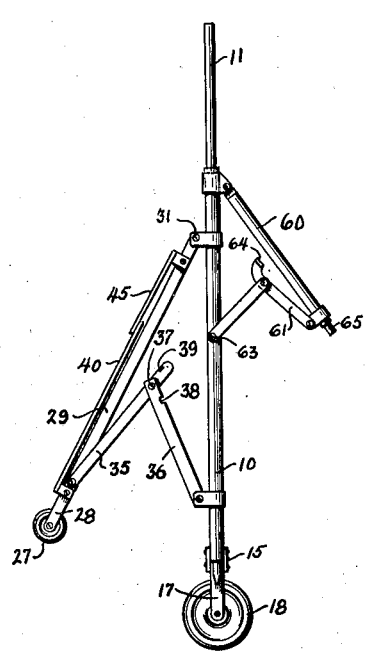
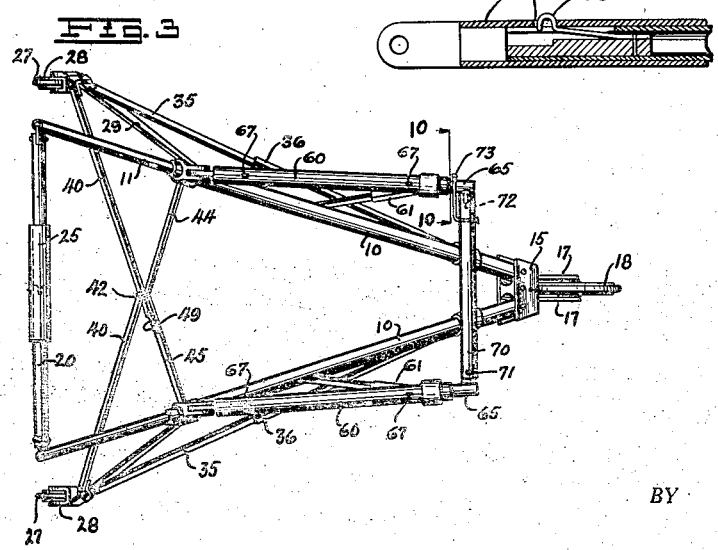
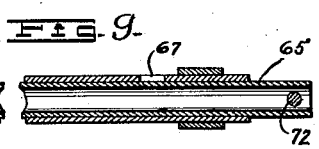
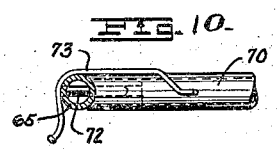
INVENTOR.
TRACEY A. TISDELL
BY
ATTORNEY.

March 9, 1926.  1,576,075
T. A. TISDELL
COMBINED GOCART, HIGH CHAIR, AND BABY CARRIAGE
Filed Jan. 24, 1925   2 Sheets-Sheet 2
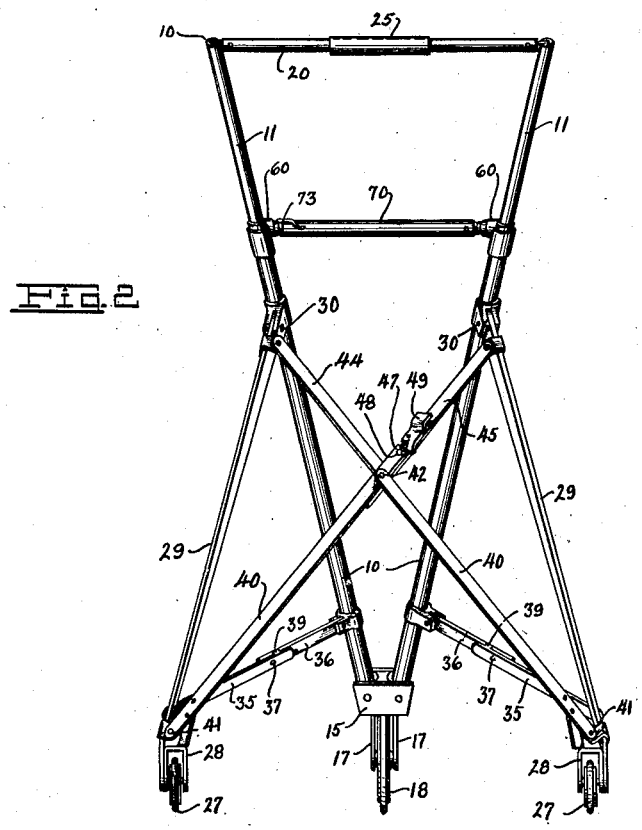
INVENTOR.
TRACEY A. TISDELL
BY
ATTORNEY.

Patented Mar. 9, 1926.

1,576,075

UNITED STATES PATENT OFFICE.

TRACEY A. TISDELL, OF LOS ANGELES, CALIFORNIA.

COMBINED GOCART, HIGH CHAIR, AND BABY CARRIAGE.

Application filed January 24, 1925. Serial No. 4,472.

*To all whom it may concern:*

Be it known that I, TRACEY A. TISDELL, a citizen of the United States, residing at Los Angeles, in the county of Los Angeles and State of California, have invented a certain new and useful Improvement in Combined Gocarts, High Chairs, and Baby Carriages, of which the following is a full, clear, and exact description, reference being had to the accompanying drawings.

This invention relates to combined baby carriages, go-carts and high chairs.

The general object of the invention is to provide a collapsible structure which may be readily folded into a small compact bundle and which when extended for use is thoroughly rigid and secure.

One of the specific objects of the invention is to provide an improved collapsible go cart wherein a novel folding mechanism is included so that the structure may be quickly and easily folded and unfolded.

Other objects of the invention will be apparent from the following description taken in connection with the accompanying drawings wherein Fig. 1 is a side elevation of a go cart embodying the features of my invention; Fig. 2 is a rear elevation thereof; Fig. 3 is a top plan view of the go cart; Fig. 4 is a side elevation of the go cart showing the same partly collapsed; Fig. 5 is a rear elevation of the go cart showing it in another position while being collapsed; Fig. 6 is an elevation of the completely collapsed go cart; Fig. 7 is a fragmentary section of a joint; Fig. 8 is a section on line 8—8, Fig. 7; Fig. 9 is a central sectional view showing one of the releasable joints; Fig. 10 is a fragmentary section taken on line 10—10 of Fig. 3, showing a detail; and Fig. 11 is an enlarged elevation showing the bracket for supporting the rear wheels.

Referring to the drawing by reference characters, I have shown a go cart embodying the features of my invention at 10. This go cart comprises a pair of handle members 11. These handle members are pivotally mounted as at 12 to a wheel supporting device 14. This wheel supporting device comprises front and back members 15 which are brought together upon a spacing block 16. This spacing block also receives supports 17 for a wheel 18. The parts may be held together by suitable fastening members 19 as shown.

The construction is such that the arms 11 may be folded until they are approximately parallel. In order to hold the arms in the position shown in Fig. 2 I pivotally mount a cross piece 20 at the upper end of the arms. This cross piece 20 as shown comprises two parts which are hinged together as at 21. When the arms 11 are brought to parallel relation, the cross piece 20 is folded as shown in Figs. 5 and 6. In order to hold the cross piece extended I employ a sliding sleeve 25 which moves over the joint 21 and holds the parts assembled.

In order to support the go cart I provide a pair of spaced rear wheels 27. Each of these rear wheels is supported in a suitable bracket 28. Each of the brackets is secured on struts 29 and the struts in turn are pivoted to the handle members 11 at 30. The construction is such that the struts 29 may be arranged alongside the handle members when the go cart is collapsed.

In order to hold the struts in operative position as shown in Fig. 1 I pivot a stay 35 near the lower end of each strut. I also pivot to each handle member a companion stay 36. The stays are pivotally united as at 37 and one stay may be provided with a notch 38 and with a lug 39, as shown in Fig. 4 to hold the parts in the position shown in Fig. 1. In Fig. 4 the operation of collapsing the wheel structure 27, etc., is shown. It will be noted that the joint 37 has been moved upwardly thus allowing the wheel 27 to move toward the handle member 11 as shown.

In order to hold the struts 29 apart, I provide cross braces 40. These cross braces are arranged in upper and lower pairs, each pair having one extremity pivoted at 41 to the bracket 28 while the upper extremities are pivotally united as at 42. The upper pair of braces 44—45 are pivotally mounted on the struts as shown in Fig. 2 so that when the handle members are collapsed to the position shown in Fig. 6 the braces may fold inwardly. When completely folded they will assume the position shown in Fig. 6. The braces are shown as connected in Fig. 2 by means of a pin 47 on the member 45 which engages a notch 48 on the member 40. A locking lever 49 holds these parts assembled.

Referring to Fig. 2 it will be noted that the members 40 are disposed below the members 44 and 45. When the cart is to be collapsed these members 40 are sprung to one side and are arranged beneath the members 44 and 45, as shown in Fig. 5. This allows a compact folding action.

The handle members 10 are shown as provided with a pair of pivoted arms 60. Each of these arms is held in erect position by supports 61. The supports 61 comprise two portions one pivoted at 62 to the arm 60 and the other pivoted at 63 to the handle member 11. A stop member 64 holds the arms at the proper angle. The arms 60 are provided with telescopic extension members 65 which slidably fit within the arms. Each of these telescopic members, as shown in detail in Fig. 9, is provided with a fastening member 66 which fits in apertures 67, to hold the extensions in retracted and expanded position.

One of the telescopic extension members has a cross piece 70 pivoted thereon as at 71. The other end of the cross piece is recessed to receive a pin 72 on the portion 65 as shown in Fig. 3. A clamp 73 (shown in Fig. 10) is arranged on the cross piece 70 and serves to engage the members 65 to hold the carriage in assembled relation.

The go cart is shown as provided with a container 80. This container is preferably made of flexible cloth and may be provided with a cushion if desired. The container 80, which receives the infant is preferably supported from the cross piece 20 by straps 81. The container is provided with a turned over portion 82 along the top sides thereof and through this turned over portion the arms 60 extend. The end of the container, as at 83, is also provided with a turned over portion for receiving the cross piece 70. A suitable loop 84 may be provided to surround the supports 61 to hold the lower portion of the container 80.

When the go cart is opened to the position shown in Fig. 1 the container is supported as previously described. This position of the container serves when the device is to be used as a go cart or as a high chair. In this position the container will bag down in the front as shown in the drawings to thus accommodate the feet of the infant.

When the device is to be used as a baby buggy the projections 66 are operated and the extension 65 is moved to the dotted line position as shown in Fig. 1. This action straightens the bottom of the container so that the infant may recline.

When it is desired to fold the go cart the clamp 73 is raised and the container is then drawn from the cross-piece 70. The cross piece 70 is then folded into parallel relation with one of the arms. This being done, the clamp 49 is moved to release the joint 47—48. After this is done, the slide 25 is moved to one side of the joint 21. The joint 37 is then raised. The two handle members 11 are now brought together.

This brings the parts into position shown in Fig. 5. The handle members are then advanced until they assume the position shown in Fig. 6 wherein the portions of the cross piece 20 are arranged parallel to the parallel handles and wherein the parts 35 and 36 are moved to substantial parallel position, while the braces 40, 44, 45 are also moved to collapsed position. A reverse operation from that just described serves to bring the go cart to operative position. A suitable container, of canvas or other material, may be provided for the collapsed go cart.

From the foregoing description it will be apparent that I have provided a combined baby buggy, high chair, and go cart which is extremely simple, which is durable and which can be economically manufactured.

Having thus described my invention, I claim:

1. In a go cart, a body including a pair of handle members and a wheel structure including a supporting wheel, pivots connecting said handle members to said wheel structure, the axes of said pivots extending at substantially right angles to the axis of rotation of said supporting wheel whereby the handle members may be moved together, a strut pivoted on each handle member, and wheels supported on said struts.

2. In a device of the character described, a body including a pair of diverging handle members, a wheel structure, said handle members being pivotally attached at one end thereof to the wheel structure for angular movement toward each other, a pair of rear wheels, a pair of arms pivoted to said body, a folding support for said arms, said arms being arranged to fold against said body.

3. In a go cart, a body including a pair of handle members and a wheel structure, said handle members each being pivotally attached to the wheel structure, the axes of said pivots extending longitudinally of said body a cross piece to hold said handle members spaced, a pair of spaced rear wheels, a pair of struts secured to said handle members for supporting said rear wheels, means to brace said struts, means secured to said struts to prevent spreading of said wheels, a pair of arms on said handle members, and a flexible container between said arms.

4. In a device of the character described, a pair of diverging handle members, a front wheel structure, said handle members being pivotally attached to the front wheel structure for angular movement toward each other, a rear wheel structure including a pair of spaced wheels pivoted on said handle members and adapted to be folded adjacent said handle members, an arm on each handle member, said arms having pivoted joints with the handle members, and being adapted to fold against the handle members.

5. In a device of the character described, a pair of handle members, said handle members being pivotally attached to a wheel structure at one end thereof so that the handle members can fold adjacent each other, means to hold said handle members spaced, a pair of rear wheels, means to hold said rear wheels in operative position, a pair of arms on said handle members, supports for said arms, a cross piece connecting said arms, means to secure the cross piece to said arms, said means comprising a member slidable on each arm, whereby the effective length of the device can be altered.

6. In a device of the character described, a pair of diverging handle members, said handle members being pivotally attached to a wheel structure for angular movement towards each other, means to hold said handle members spaced, a pair of spaced rear wheels, a pair of struts secured to said handle members for supporting said rear wheels, means to hold said struts in position, a pair of arms on said handle members, whereby said struts, said first mentioned means and said arms may be folded to a position adjacent said handle members.

7. In a device of the character described, a pair of diverging handle members, said handle members being pivotally attached to a wheel structure at one end thereof, a cross piece to hold said handle members spaced apart, means whereby the cross piece can be folded and said handle members brought together, a rear wheel structure pivoted to said handle members and adapted to fold against said handle members, an arm pivoted on each handle member and adapted to fold against the handle member, and a flexible container between said arms.

8. In a device of the character described, a pair of handle members, said handle members being pivotally attached to a wheel structure at one end thereof, a cross piece to hold said handle members spaced apart, means whereby the cross piece can be folded and said handle members brought together, a pair of rear wheels, a pair of struts hinged to said handle members for supporting said rear wheels, a pair of collapsible stays hinged to said handle members and said struts, for supporting said struts, said stays having pivoted joints intermediate their lengths, bottom and top braces hinged to said struts, said braces each comprising two hingedly connected sections and means to unite the top and bottom braces adjacent the joints thereof, arms pivotally mounted on said handle members, hinged supports for said arms, and a flexible container between said arms.

In testimony whereof, I hereunto affix my signature.

TRACEY A. TISDELL.